US012569910B2

(12) United States Patent
Yoshidome et al.

(10) Patent No.: US 12,569,910 B2
(45) Date of Patent: Mar. 10, 2026

(54) MAGNETIC CORE, MAGNETIC COMPONENT AND ELECTRONIC DEVICE

(71) Applicant: TDK CORPORATION, Tokyo (JP)

(72) Inventors: Kazuhiro Yoshidome, Tokyo (JP); Hiroyuki Matsumoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/411,898

(22) Filed: Aug. 25, 2021

(65) Prior Publication Data

US 2022/0062986 A1 Mar. 3, 2022

(30) Foreign Application Priority Data

Aug. 25, 2020 (JP) ................................ 2020-141722

(51) Int. Cl.

| | |
|---|---|
| ***B22F 1/00*** | (2022.01) |
| ***B22F 1/02*** | (2006.01) |
| ***B22F 1/065*** | (2022.01) |
| ***B22F 1/08*** | (2022.01) |
| ***B22F 9/08*** | (2006.01) |
| ***H01F 1/20*** | (2006.01) |
| *B22F 1/16* | (2022.01) |

(52) U.S. Cl.

CPC ................ *B22F 1/065* (2022.01); *B22F 1/08* (2022.01); *B22F 9/082* (2013.01); *H01F 1/20* (2013.01); *B22F 1/16* (2022.01); *B22F 2009/0872* (2013.01); *B22F 2304/10* (2013.01)

(58) Field of Classification Search

None

See application file for complete search history.

(56) References Cited

U.S. PATENT DOCUMENTS

| | | | | |
|---|---|---|---|---|
| 2018/0025822 | A1* | 1/2018 | Yonezawa ............ | C22C 38/002 428/551 |
| 2018/0122543 | A1* | 5/2018 | Harada .................. | C22C 38/42 |
| 2020/0105447 | A1* | 4/2020 | Nakajima .......... | H01F 1/14791 |

FOREIGN PATENT DOCUMENTS

| | | | |
|---|---|---|---|
| JP | 2004-197218 | A | 7/2004 |
| JP | 2004-363466 | A | 12/2004 |
| JP | 2017-107935 | A | 6/2017 |
| JP | 2020-095988 | A | 6/2020 |

* cited by examiner

*Primary Examiner* — Alexandre F Ferre

(57) ABSTRACT

A magnetic core including a magnetic powder. A total area ratio of particles of the magnetic powder in a cross section of the magnetic core is 75% or more and 90% or less. An average circularity of large size particles is 0.70 or more when the large size particles are particles extracted from the particles of the magnetic powder in the cross section of the magnetic core in the order of size from the largest size until a cumulative area ratio of the extracted particles reaches a smallest area ratio exceeding 20% of the total area ratio of the particles of the magnetic powder.

10 Claims, 5 Drawing Sheets

MAGNETIC CORE, MAGNETIC COMPONENT AND ELECTRONIC DEVICE

TECHNICAL FIELD

The present invention relates to a magnetic core, a magnetic component, and an electronic device.

BACKGROUND

Patent Document 1 discloses a core using a composite magnetic material obtained by mixing an insulation binder with a mixed magnetic powder which is made by mixing an iron-based crystalline alloy magnetic powder and an iron-based amorphous alloy powder.

Patent Document 2 discloses an inductor using a composite magnetic material in which a heat curable resin is covering each particle included in a mixed magnetic powder obtained by mixing a hard amorphous alloy magnetic powder and a Fe—Ni based alloy magnetic powder.

[Patent Document 1] JP Patent Application Laid Open No. 2004-197218

[Patent Document 2] JP Patent Application Laid Open No. 2004-363466

SUMMARY

The object of the present invention is to provide a magnetic core having a high permeability and a high voltage resistance, while having a small variation in voltage resistance.

In order to achieve the above object, a magnetic core of the present invention includes a magnetic powder, wherein a total area ratio of particles of the magnetic powder in a cross section of the magnetic core is 75% or more and 90% or less, and an average circularity of large size particles is 0.70 or more when the large size particles are particles extracted from the particles of the magnetic powder in the cross section of the magnetic core in the order of size from the largest size until a ratio of a cumulative area of the extracted particles reaches a smallest area ratio exceeding 20% of the total area ratio of the particles of the magnetic powder.

By having the above-mentioned characteristics, the magnetic core of the present invention achieves a high permeability and a high voltage resistance, while having a small variation in voltage resistance.

An average circularity of the large size particles in the cross section of the magnetic core may be 0.80 or more.

Particle sizes of the large size particles in the cross section of the magnetic core may be 5 μm or more and 50 μm or less.

An average elliptic circularity of the particles of the magnetic powder in the cross section of the magnetic core may be 0.90 or more.

The large size particles may have amorphous structures in the cross section of the magnetic core.

The large size particles in the cross section of the magnetic core may have nanohetero structures in which a fine crystal having a crystal size of 0.3 nm or more and less than 5 nm exists in amorphous.

The large size particles in the cross section of the magnetic powder may have structures made of nanocrystals having crystal sizes of 5 nm or more and 50 nm less.

The magnetic core may further include a resin.

A magnetic component according to the present invention includes the above-mentioned magnetic core.

An electronic device according to the present invention includes the above-mentioned magnetic core.

DETAILED DESCRIPTION

Figure 1:
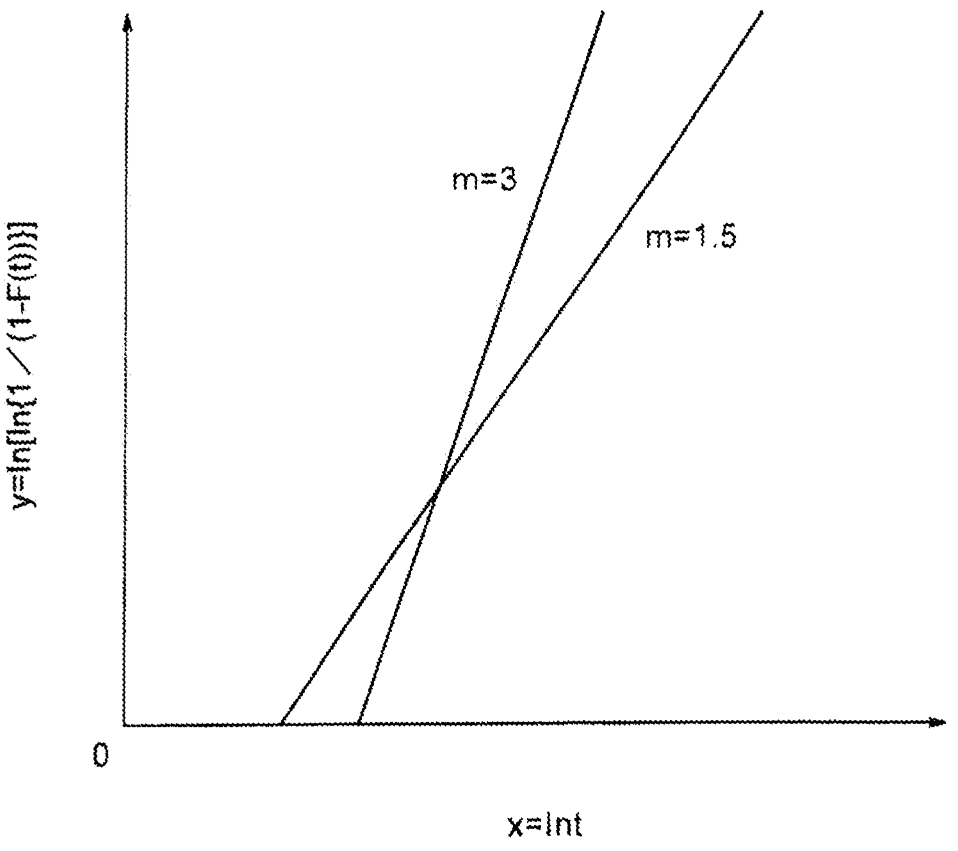
FIG. 1 is a schematic diagram of Weibull plot.

Hereinbelow, a magnetic core according to the embodiment of the present invention is described.

The magnetic core includes a magnetic powder as a magnetic body. Also, the magnetic core may include an iron-based soft magnetic alloy powder which is described in below as the magnetic powder.

Further, the magnetic core may include a resin. A type and an amount of the resin are not particularly limited. As the type of resin, a heat curable resin such as a phenol resin, an epoxy resin, and the like may be mentioned. The amount of the resin may be 1 mass % or more and 5 mass % or less with respect to the magnetic powder.

A total area ratio of the particles of the magnetic powder in the cross section of the magnetic core is 75% or more and 90% or less. An average circularity of large size particles is 0.70 or more when the large size particles are particles extracted from the particles of the magnetic powder in the cross section of the magnetic core in the order of size from the largest size until a ratio of a cumulative area of the extracted particles reaches a smallest area ratio exceeding 20% of the total area ratio of the particles of the magnetic powder. The average circularity of the large size particles may be 0.80 or more, may be 0.90 or more, and may be 0.95 or more.

As the total area ratio of the particles of the magnetic powder increases, a relative permeability tends to improve easily. As the total area ratio of the particles of the magnetic powder decreases, distance between the particles of the magnetic powder becomes longer, and a resin fills in the space between the particles of the magnetic powder and forms a resin layer. Therefore, as the total area of the particles of the magnetic powder decreases, a voltage resistance tends to improve easily. In order to evaluate the voltage resistance and the relative permeability in totality, the present inventors have found that "voltage resistance×relative permeability" may be used for evaluation. As "voltage resistance×relative permeability" increases, both the voltage resistance and the relative permeability are improved in good balance. The evaluation using "voltage resistance×relative permeability" can be suitably used for evaluating the influence to the magnetic core caused by the difference in shapes of the particles of the magnetic powder when the total area ratios of the particles of the magnetic powders are about the same but the shapes of the particles are different.

The present inventors have found a method to further increase both the relative permeability and the voltage resistance of the magnetic core using the magnetic powder, to increase "voltage resistance×relative permeability", and also to make the variation in the voltage resistance small.

Specifically, the present inventors have found that it is more important to control the above-mentioned circularity of the large size particles than to control the average circularity of the entire particles of the magnetic powder.

The magnetic core having the above-mentioned characteristics achieves high relative permeability and voltage resistance, a high "voltage resistance×relative permeability", and a small variation in the voltage resistance compared to a magnetic core having about the same total area ratio of the particles of the magnetic powder but not satisfying the above-mentioned characteristics.

A particle size distribution of the magnetic powder included in the magnetic core can be measured by SEM observation. Specifically, a particle size (Heywood diameter) of each particle of the magnetic powder included in an arbitrary cross section of the magnetic core is calculated from SEM image. A magnification of SEM observation is not particularly limited as long as the particle size of the particle included in the magnetic powder can be measured. Also, an observation range of the SEM observation is not particularly limited, and the observation field may at least include 500 particles or more, and preferably 1000 particles or more.

Further, in the above-mentioned observation field in the cross section of the magnetic core, the large size particles refer to the particles which are extracted in the order of size from the largest size until a ratio of cumulative area of the extracted particles reaches the smallest area ratio exceeding 20% of the total area ratio of the magnetic powder. In other words, the particles of the magnetic powder included in the above-mentioned observation field of the cross section of the magnetic core are extracted, then the particles of the magnetic powder are aligned in the order of size from the largest size, then areas of the particles are cumulated from large size. Among the particles of the magnetic powder in the above-mentioned observation field, the large size particles refer to the particles when a ratio of a cumulative area exceeds 20% of the total area ratio of the entire particles of the magnetic powder.

Regarding the definition of the large size particles, a hypothetical example is used to described in below. In hypothetical example, a particle having an area ratio of 10% (10% particle), a particle having an area ratio of 7% (7% particle), a particle having an area ratio of 5% (5% particle), a particle having an area ratio of 4% (4% particle), and particles each having an area ratio of 3% or less (3% particles) exist in the observation field. In this case, when the particles of the magnetic powder are extracted in the order of size from the largest size, then the particles are extracted in the order of 10% particle, 7% particle, and 5% particle. When 10% particle and 7% particle are extracted, a ratio of a cumulative area of the extracted particles is 17% which does not exceed 20%. Further, when 10% particle, 7% particle, and 5% particle are extracted, a ratio of a cumulative area is 22% which exceeds 20%. When, 10% particle, 7% particle, 5% particle, and 4% particle are extracted, a ratio of a cumulative area further increases. Therefore, a smallest area ratio exceeding 20% is a ratio of a cumulative area of 22% which is when 10% particle, 7% particle, and 5% particle are extracted. In this case, the large size particles are the extracted particles of 10% particle, 7% particle, and 5% particle.

Note that, the particle sizes of the large size particles are not particularly limited. For example, the particle sizes of the large size particles may be within a range of 1 μm or more to 150 μm or less, may be within a range of 3 μm or more and 100 μm or less, and may be within a range of 5 μm or more 50 μm or less.

Also, D50 of the particles of the magnetic powder in a number-based particle size distribution in the cross section of the magnetic core is not particularly limited. For example, D50 may be within a range of 0.1 μm or more and 100 μm or less, may be within a range of 0.5 μm or more and 50 μm or less, and may be within a range of 0.5 μm or more and 20 μm or less. Note that, D50 is a particle size when a cumulative value of the sizes of the particles of the magnetic powder is at 50%.

The average circularity of the large size particles in the magnetic core using the magnetic powder can be changed mainly by controlling a method of producing the magnetic powder.

A circularity of the large size particle included in the magnetic powder is represented by $2\times(\pi\times S)^{1/2}/L$ in which S is an area of the large size particle in the cross section and L is a circumference length of the large size particle.

The circularities of the large size particles identified by the above-mentioned method are calculated, then the average thereof is taken. Thereby, the average circularity of the large size particles is obtained.

Also, the average elliptic circularity of the particles of the magnetic powder included in the magnetic core may preferably be 0.90 or more, and more preferably it may be 0.95 or more. As the average elliptic circularity of the particles of the magnetic powder increases, the voltage resistance tends to increase easily, and the voltage resistance tends to vary less.

An elliptic circularity of the particle of the magnetic powder is represented by $4\times S/(l\times s\times\pi)$, in which S is an area of the particle of the magnetic powder in the cross section, l is a length of long axis, and s is a length of short axis.

In general, when the particle is flattened, a circularity tends to decrease. However, even when the particle is flattened, an elliptic circularity is large. On the other hand, when the particle has dents or strains, a circularity may not be small in some cases. However, when the particle has dents or strains, an elliptic circularity is small. Note that, when the particle has shapes with prominent concave and convex, the circularity and the elliptic circularity are both small. That is, it is preferable to use the elliptic circularity in order to verify whether the particle is deformed from true circle besides being flat, or to evaluate whether the particle has dents and strains or convex and concave.

Here, whether the particles included in the magnetic core are flattened or not barely influence the voltage resistance property. On the other hand, the voltage resistance property tends to be easily influenced by whether the particles are deformed other than being flat. For example, whether the particles included in the magnetic core have dented shapes or not, stained shapes or not, have prominent convex and concave shapes tend to easily influence the voltage resistance property. This is because the voltage resistance property of the magnetic core tends to improve as a number of places where electric field concentrate decreases while voltage is applied. The number of places where the electric field is concentrated does not necessarily depend on whether the particle shapes are flat or not, but rather depends on whether the particles are deformed into shapes other than flat shape.

A method for evaluating a variation in the voltage resistance is not particularly limited. Hereinbelow, an example for a method of evaluating the variation in the voltage resistance by Weibull distribution is described.

According to Weibull distribution, a failure rate λ(t) to a time t is shown by a below formula (I). Here, m is a Weibull modulus, and α is a scale parameter.

$$\lambda(t)=(m/\alpha^{m})\times t^{m-1} \quad \text{Formula (I)}$$

Here, when m<1, the formula (I) shows a property that the failure rate decreases along with time. When m=1, the formula (I) shows a property that the failure rate is constant with respect to time. When m>1, the formula (I) shows a property that the failure rate increases along with time. In below, a method of calculation of Weibull modulus m is described.

A reliability R(t) (a rate which does not cause failure) of a product having the above-mentioned failure rate λ(t) is shown by below formula (II).

$$R(t)=\exp\{-(t/\alpha)^{m}\} \quad \text{Formula (II)}$$

Further, unreliability (cumulative failure rate) F(t) is shown by below formula (III).

$$F(t)=1-R(t)=1-\exp\{-(t/\alpha)^{m}\} \quad \text{Formula (III)}$$

Here, below formula (IV) is obtained by changing the formula (III).

$$\ln[\ln\{1/(1-F(t))\}]=m\ln t-m\ln\alpha \quad \text{Formula (IV)}$$

Here, below formula (V) is obtained when y=ln[ln{1/(1−F(t))}] and x=lnt.

$$y=mx-m\ln\alpha \quad \text{Formula (V)}$$

That is, a straight line is formed when y=ln[ln{1/(1−F(t))}] is plotted against x=lnt, and Weibull modulus can be calculated from the slope of the straight line. This method is called as Weibull plot.

In case m>1, as the Weibull modulus m increases, the unreliability (cumulative failure rate) F(t) near a time t drastically increases. That is, as the Weibull modulus increases, the time which takes for each product to fail less varies.

FIG. 1 shows a schematic diagram of Weibull plot. In FIG. 1, when m=3, F(t) is drastically increased near a time t compared to the case of m=1.5. That is, when m is large, many products fail at the same time near a time t, thus this means the time which takes for each product to fail less varies. Note that, in Weibull plot, as the straight line moves to the right, the time for each product to fail will become longer.

A Weibull modulus can be obtained by measuring the voltage resistance of a plurality of magnetic cores and making Weibull plot of the measurement results. The voltage resistance is a voltage at which a predetermined degree of current flows when voltage is applied to the magnetic core. Further, Weibull plot can be done by plotting "applied voltage V per unit length" instead of the above-mentioned "time t", and plotting "flow of current having a predetermined degree" instead of "failure" mentioned in above. A method of Weibull plotting is not particularly limited. Other than a method of calculating m by plotting test results on a Weibull probability paper, in recent years, computer programs are widely used in which by inputting the test results, Weibull plotting is automatically performed, then calculates the Weibull modulus m.

As mentioned hereinabove, in case of evaluating a variation of the voltage resistance using Weibull distribution, as the Weibull modulus m increases, the voltage resistance varies less.

A composition of the magnetic powder is not particularly limited. A soft magnetic alloy powder may be used as the magnetic powder. As described in below, two or more magnetic powders having different particle sizes may be mixed.

The magnetic core may include an iron-based magnetic alloy powder as the magnetic powder, and the iron-based magnetic alloy powder is represented by a compositional formula $(Fe_{(1-(\alpha+\beta))}X1_{\alpha}X2_{\beta})_{(1-(a+b+c+d+e+f))}M_{a}B_{b}P_{c}Si_{d}C_{e}S_{f}$, wherein

- X1 is one or more selected from the group consisting of Co and Ni;
- X2 is one or more selected from the group consisting of Al, Mn, Ag, Zn, Sn, As, Sb, Cu, Cr, Bi, N, O, and rare earth elements;
- M is one or more selected from the group consisting of Nb, Hf, Zr, Ta, Mo, W, Ti, and V;

$0\le a\le 0.150$,
$0\le b\le 0.200$,
$0\le c\le 0.200$,
$0\le d\le 0.200$,
$0\le e\le 0.200$,
$0\le f\le 0.0200$,
$0.100\le a+b+c+d+e\le 0.300$,
$\alpha\ge 0$,
$\beta\ge 0$, and
$0\le \alpha+\beta\le 0.50$ are satisfied.

In the cross section of the magnetic core, a total area ratio of the particles of the iron-based magnetic alloy powder may be 50% or more of a total area ratio of the particles of the magnetic powder.

The magnetic core includes the particles of the iron-based magnetic alloy powder having the above-mentioned composition within the above-mentioned range, hence a coercivity HcJ of the magnetic core decreases and the relative permeability of the magnetic core tends improve further easily.

A total area ratio of the particles of the iron-based soft magnetic alloy powder may be 70% or more, and may be 90% or more.

The particles of the iron-based magnetic alloy powder may include elements other than mentioned in above as inevitable impurities. For example, 0.1 mass % or less of the inevitable impurities may be included with respect to 100 mass % of the particles of the iron-based soft magnetic alloy powder.

The particles of the iron-based soft magnetic alloy powder included in the magnetic core according to the present embodiment may preferably include nanocrystals of which crystal sizes are 5 nm or more and 50 nm or less and have bcc crystal structures. As the particles of the iron-based soft magnetic alloy powder include the above-mentioned nanocrystals, HcJ of the magnetic core tends to decrease further easily and the relative permeability tends to improve easily.

Hereinbelow, a method of producing the magnetic core according to the present embodiment is described.

First, the magnetic powder included in the magnetic core is produced. A method of producing the magnetic powder is not particularly limited. For example, an atomization method may be mentioned. A type of the atomization method is not particularly limited, and a water atomization method, a gas atomization method, and the like may be mentioned. Hereinafter, a method of producing the magnetic core including the iron-based soft magnetic alloy powder as the magnetic powder is described.

In case the iron-based soft magnetic alloy powder obtained by an atomization method has a structure made of amorphous, by performing a heat treatment, the nanocrystals of bcc crystal structure having crystal sizes of 5 nm or more and 50 nm or less can be precipitated. Thereby, the iron-based soft magnetic alloy powder having a structure made of nanocrystals can be obtained. For example, heat treatment conditions may be 350° C. or higher and 800° C. or lower for 0.1 minutes or longer and 120 minutes or less. Note that, in one particle of the iron-based soft magnetic alloy powder, usually many nanocrystals are included. That is, the particle sizes of the particles of the iron-based soft magnetic alloy powder and the crystal sizes of the nanocrystals are different. Also, the crystal structure of the iron-based soft magnetic alloy powder can be verified by XRD and a transmission type electron microscope. When evaluating a fine structure of the iron-based soft magnetic alloy powder of the magnetic core, the fine structure can be verified by a bright field method and a selected vision diffraction method. In case the iron-based soft magnetic alloy powder includes the nanocrystals, HcJ of the magnetic core obtained at the end tends to decrease easily, and a relative permeability tends to be high. Also, a fine structure of the iron-based soft magnetic alloy powder and a fine structure of the particle of the iron-based soft magnetic alloy powder may be considered the same.

Hereinafter, the fine structure of the iron-based soft magnetic alloy powder is described.

In order to include the nanocrystals in the iron-based soft magnetic alloy powder, in general, the iron-based soft magnetic alloy powder having a structure made of amorphous is heat treated to precipitate the nanocrystals. Here, the structure made of amorphous refers to a structure in which an amorphous ratio X shown by below formula (1) is 85% or more. Further, a structure made of crystal refers to a structure having the amorphous ratio X of less than 85%.

$$X=100-(Ic/(Ic+Ia))\times 100 \qquad (1)$$

Ic: Crystal scattering integrated intensity

Ia: Amorphous scattering integrated intensity

X ray crystallography is performed to the iron-based soft magnetic alloy powder using XRD, and phases are identified to read peaks of crystallized Fe or crystallized compounds (Ic: Crystal scattering integrated intensity, Ia: Amorphous scattering integrated intensity). Then, a crystallization ratio is determined from these peaks, and the amorphous ratio X is calculated from the above-mentioned formula (1). In below, the method of calculation is described in further detail.

Figure 2:
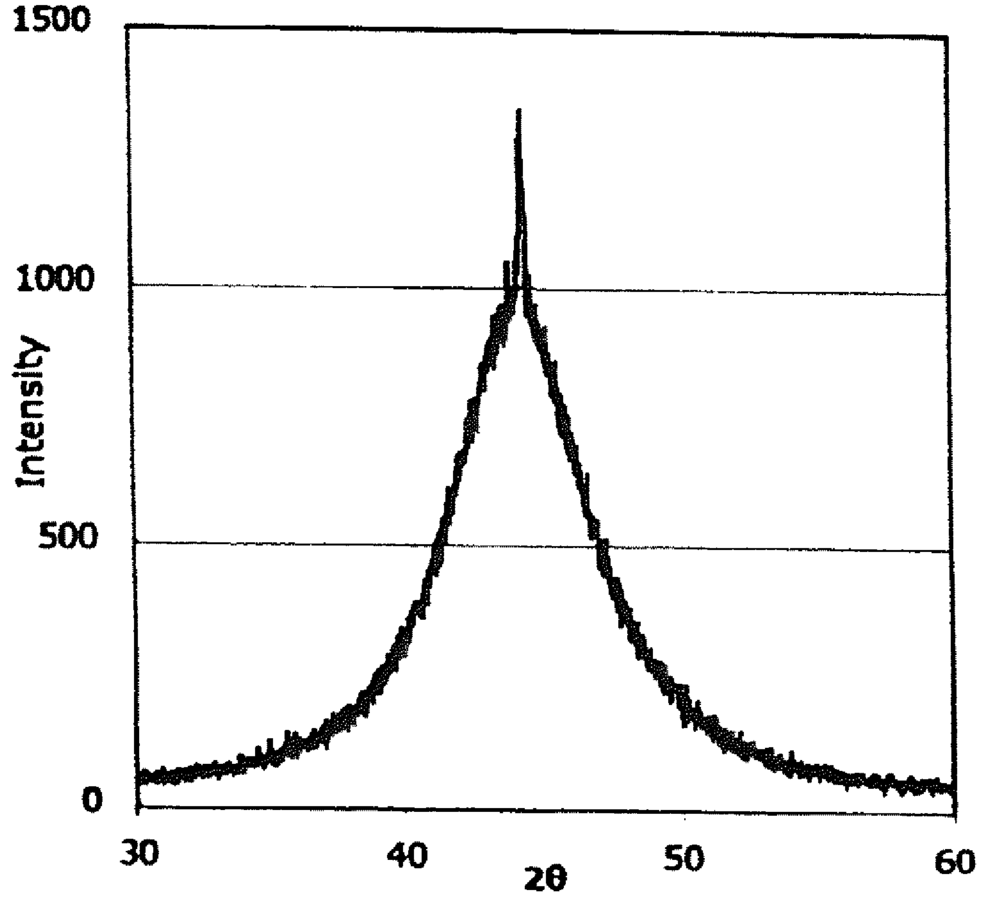
FIG. 2 is an example of a chart obtained by X ray crystallography.
Figure 3:
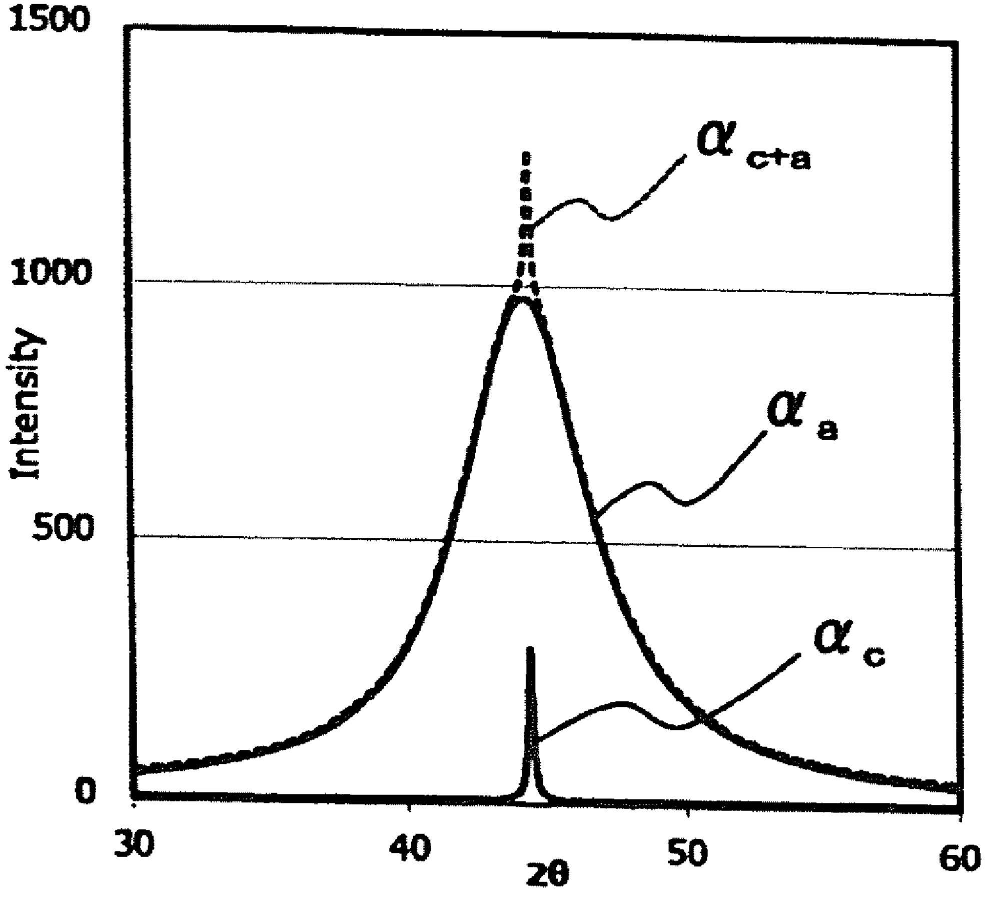
FIG. 3 is an example of a pattern obtained by profile fitting the chart shown in FIG. 2.

Regarding the iron-based soft magnetic alloy powder, X ray crystallography is performed by XRD to obtain a chart shown in FIG. 2. Then, profile fitting is performed to this chart using a Lorenz function shown by the formula (2). Thereby, as shown in FIG. 3, a crystal component pattern ac which indicates a crystal scattering integrated intensity, an amorphous component pattern $\alpha_a$ which indicates an amorphous scattering integrated intensity, and a pattern $\alpha_{c+a}$ which is a combination of these are obtained. According to the obtained crystal scattering integrated intensity pattern and the amorphous scattering integrated intensity pattern, the amorphous ratio X is obtained using the above-mentioned formula (1). Note that, as a range of measurement, the range is within a diffraction angle of 2θ=30° to 60° in which a halo derived from amorphous can be confirmed. Within this range, a difference between the integrated intensity obtained from actual measurement by XRD and the integrated intensity calculated using a Lorenz function is set within 1%.

[Formula 2]

$$f(x)=\frac{h}{1+\frac{(x-u)^2}{w^2}}+b \qquad (2)$$

h: Peak height u: Peak position w: Half bandwidth b: Background height

In general, as the amorphous ratio X of the iron-based soft magnetic alloy powder increases, the coercivity tends to decrease easily. Further, since the iron-based soft magnetic alloy powder after the heat treatment has a structure made of nanocrystals, the saturation magnetic flux density of the magnetic core tends to increase easily and the coercivity tends to decrease easily compared to the case of the iron-based soft magnetic alloy powder having a structure made of amorphous. When the magnetic core is made using the iron-based soft magnetic alloy powder having a low coercivity, the permeability of the magnetic core tends to improve.

Hereinafter, a method of production of the iron-based soft magnetic alloy powder using a gas atomization method is described.

Figure 4A:
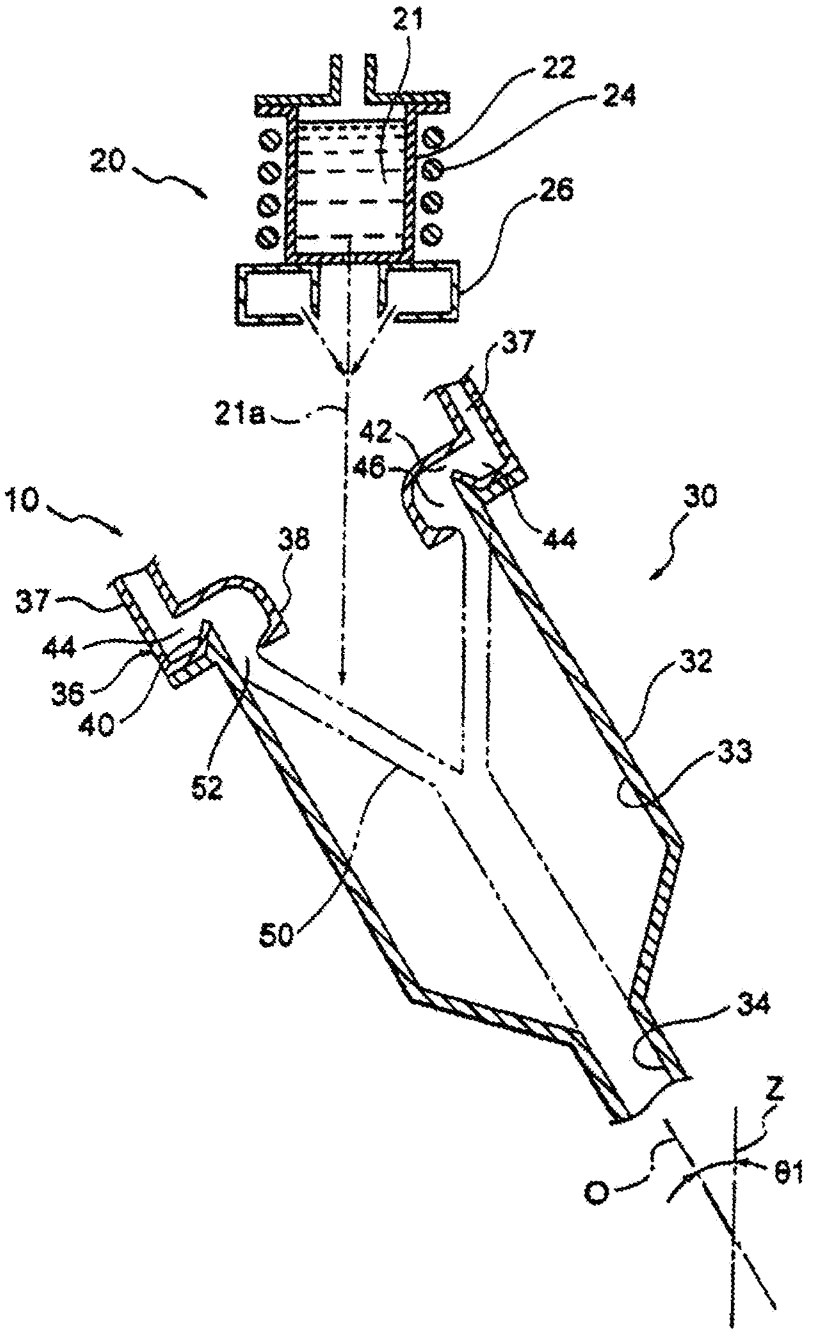
FIG. 4A is a schematic diagram of an atomization apparatus.
Figure 4B:
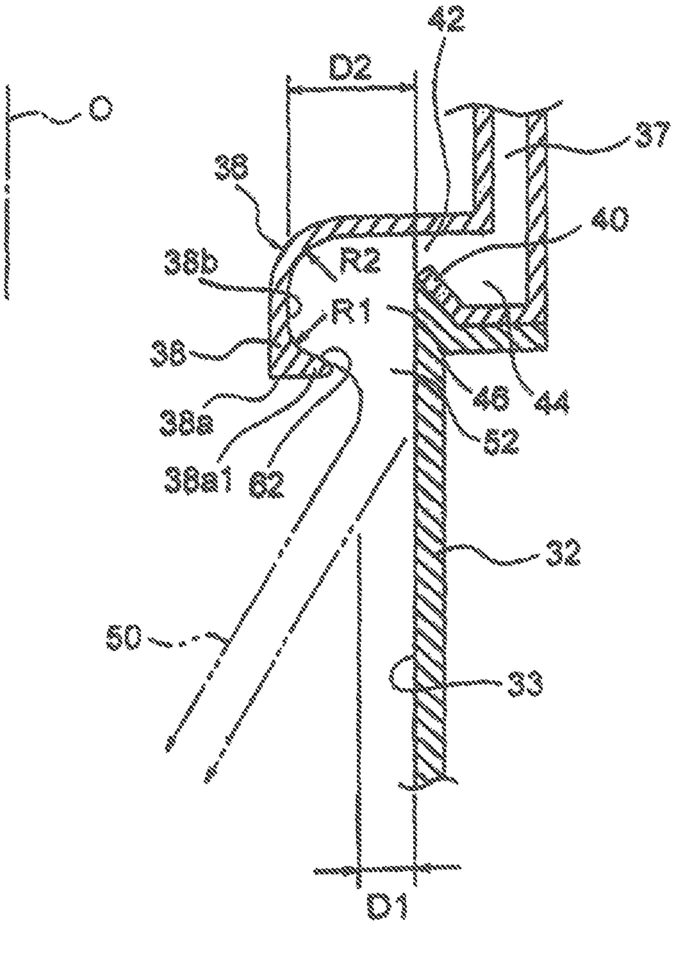
FIG. 4B is a schematic diagram of an essential part of FIG. 4A being enlarged.

The present inventors have found that when an atomization apparatus shown in FIG. 4A and FIG. 4B is used as an atomization apparatus, the iron-based soft magnetic alloy powder having a larger particle size can be produced easily, and the amorphous iron-based soft magnetic alloy powder can be obtained easily.

As shown in FIG. 4A, the atomization apparatus 10 includes a molten metal supplier 20, and a cooling part 30 provided at lower side in vertical direction of the molten metal supplier 20. In the figures, the vertical direction is a direction along Z axis.

The molten metal supplier 20 includes a heat resistant container 22 which holds the molten metal 21. In the heat resistant container 22, the raw material of each metal element which has been weighed so that the soft magnetic alloy powder has a composition obtained at the end is melted by a heating coil 24 and forms the molten metal 21. A temperature during melting, that is, the temperature of the molten metal 21 may be determined according to the melting point of the raw material of each metal element, and for example the temperature can be within a range of 1200° C. to 1600° C.

The molten metal 21 is exhausted as a molten metal drop 21*a* from an exhaust port towards cooling part 30. A high-pressured gas is sprayed from a gas spraying nozzle 26 towards the exhausted molten metal drop 21*a* to form many droplets from the molten metal drop 21*a*, then the droplets move along with the gas flow towards an inner surface of a cylinder 32.

As a gas sprayed from the gas spraying nozzle 26, inert gas or reducing gas is preferable. As the inert gas, for example, nitrogen gas, argon gas, helium gas, and the like can be used. As the reducing gas, for example, ammonia decomposition gas, and the like can be used. However, in case the molten metal 21 is a metal which is difficult to oxidize, the gas sprayed from the gas spraying nozzle 26 may be air.

The molten metal drop 21*a* moving towards the inner surface of the cylinder 32 collides with a coolant flow 50 formed in an inverted cone shape at the inside of the cylinder 32, then the molten metal drop 21*a* becomes even smaller and finer size, and the alloy powder in solid form is obtained by cool solidifying. A center axis O of the cylinder 32 is tilted by a predetermined angle θ1 with respect to a vertical line Z. The predetermined angle θ1 is not particularly limited and preferably it is 0 to 45 degrees. By having the predetermined angle θ1 within such range, the molten metal drop 21*a* from the exhaust port 23 can be easily exhausted towards the coolant flow 50 which is formed in an inverted cone shape at the inside of the cylinder 32.

At a lower side along the center axis O of the cylinder 32, a discharge port 34 is provided and the alloy powder included in the coolant flow 50 can be discharged together with the coolant to outside. The alloy powder discharged together with the coolant flow is separated from the coolant in an external storage tank or so, then the alloy powder is taken out. Note that, the coolant is not particularly limited, and for example a cooling water may be used.

In the present embodiment, the molten metal drop 21*a* collides against the coolant flow 50 formed in an inverted cone shape, thus the length of time of the droplets of the molten metal drop in the air can be shortened compared to the case where the coolant flow is moving along the inner face 33 of the cylinder 32. By shortening the length of time in the air, a quenching effect can be enhanced, and the amorphous ratio X of the obtained iron-based soft magnetic alloy powder can be improved. Also, by shortening the length of time in the air, the droplets of the molten metal drop 21*a* becomes difficult to oxidize, and the obtained iron-based soft magnetic alloy powder can be made smaller efficiently, and quality of the iron-based soft magnetic alloy powder is improved.

In the present embodiment, in order to form the coolant flow of an inverted cone shape at the inside of the cylinder 32, a flow of the coolant at a coolant introducing part (coolant injection part) 36 for introducing the coolant into the cylinder 32 is controlled. FIG. 4B shows a configuration of the coolant introducing part 36.

As shown in FIG. 4B, an outer side part (outer space part) 44 which is positioned at the outside in a radial direction of the cylinder 32 and an inner side part (inner space part) 46 positioned at the inside in a radial direction of the cylinder 32 are defined by a frame 38. The outer side part 44 and the inner side part 46 are parted by a partition 40, and the outer side part 44 and the inner side part 46 are connected by a passage 42 formed at an upper part in a center axis direction of the partition 40. Such configuration allows the coolant to flow.

At the outer side part 44, a single nozzle 37 is connected which allows the coolant to flow from the nozzle 37 to the outer side part 44. The nozzle 37 may be a plurality of nozzles. Also, at a lower side in the center axis O direction of the inner side part 46, a coolant discharging port 52 is formed and the coolant at inside of the inner side part 46 can be discharged (introduced) into the cylinder 32 from the coolant discharging port 52.

An outer circumference face of the frame 38 is a coolant flow inner circumference 38*b* which guides the flow of the coolant in the inner side part 46. At a lower end 38*a* of the frame 38, an outer projection 38*al* is formed which is continuous with the coolant flow inner circumference 38*b* and is projecting to the outer side in a radial direction. Thus, a ring form space between a tip of the outer projection 38*al* and an inner face 33 of the cylinder 32 becomes the coolant discharging port 52. At an upper face of the coolant flow side of the outer projection 38*al*, a coolant flow deflecting face 62 is formed.

As shown in FIG. 4B, due to the outer projection 38*al*, a radial direction width D1 of the coolant discharging port 52 is narrower than a radial direction width D2 at a main part of the inner side part 46. As D1 is narrower than D2, the coolant which is descending towards lower direction of center axis O along the coolant flow inner circumference 38*b* of the inner side part 46 collides and deflects at the inner face 33 of the cylinder 32 by flowing along the coolant deflecting face 62 of the frame 38. As a result, as shown in FIG. 4A, the coolant is discharged in an inverted cone shape from the coolant discharging port 52 at the inside of the cylinder 32, and forms the coolant flow 50. Note that, in case of D1=D2, the coolant discharged from the coolant discharging port 52 forms a coolant flow along the inner face 33 of the cylinder 32.

Preferably, D1/D2 is ⅔ or less, more preferably ½ or less, further preferably ⅒ or more. Note that, as D1/D2 decreases, the quenching effect is facilitated, and the amorphous ratio X of the obtained iron-based soft magnetic alloy powder tends to increase. On the other hand, as D1/D2 decreases, the circularity of the obtained iron-based soft magnetic alloy powder tends to decrease. That is, in order to achieves the quenching effect (a high amorphous ratio X of the iron-based soft magnetic alloy powder) and a circularity of the iron-based soft magnetic alloy powder, D1/D2 needs to be adjusted appropriately.

Note that, the coolant flow 50 flowing from the coolant discharging port 52 is a straight line of flow in an inverted cone form which flows towards the center axis O from the coolant discharging port 52. However, the coolant flow 50 may be a spiral flow in an inverted cone form.

Also, an injection amount of the molten metal, a gas spraying pressure, a pressure inside the cylinder 32, a coolant discharging pressure, D1/D2, and the like may be determined depending on the desired particle size of the soft magnetic alloy powder. The injection amount of the molten metal may for example be 1 kg/min or more and 20 kg/min or less. The gas spraying pressure may for example be 0.5 MPa or more and 19 MPa or less. The pressure inside the cylinder 32 may for example be 0.5 MPa or more and 19 MPa or less. The coolant discharging pressure (pump pressure) may for example be 0.5 MPa or more and 19 MPa or less.

As the injection amount of the molten metal decreases, the particle size decreases, and the iron-based soft magnetic alloy powder having a structure made of amorphous tends to be produced easily. Note that, the structure made of amorphous includes an amorphous structure formed of amorphous which does not include crystal and a nanohetero structure in which a fine crystal (a crystal having a crystal size of 0.3 nm or more and 5 nm or less) exists in amorphous. A transmission type electron microscope using a bright field method and a selected vision diffraction method can be used to verify whether the iron-based soft magnetic alloy powder has an amorphous structure or not. When the iron-based soft magnetic alloy powder has a structure made of amorphous, nanocrystals tend to precipitate easily by heat treatment.

As the gas spraying pressure, the pressure inside the cylinder 32, and as the coolant discharging pressure increase, the particle size decreases and the circularity of the particle tends to decrease.

Further, the iron-based soft magnetic alloy powder having a structure made of amorphous may be heat treated to precipitate nanocrystals to obtain the iron-based soft magnetic alloy powder having a structure made of nanocrystals.

The particle size of the iron-based soft magnetic alloy powder can be adjusted by changing the conditions of the above-mentioned atomization. Also, the particle size can be adjusted by a dry classification and a wet classification. As a dry classification method, for example, dry classification using a dry sieving, and an air flow classification may be mentioned. As a wet classification method, a classification using a wet filter filtration, and a classification by centrifuging may be mentioned. That is, regarding the iron-based soft magnetic alloy powder produced by the above-mentioned atomization method, by adjusting powder producing conditions and a classification method during atomization, the particle size of the large size powder at the cross section of the magnetic core can be controlled and the average circularity of the large size powder can be controlled.

In a sieve classification, the powder is classified by a dry classification. In a classification by wet filter filtration, the powder is dispersed in a dispersing medium, and the dispersing medium with the powder is filtered. In general, the average circularity of the large size powder at a cross section of the magnetic core tends to be smaller when classified by dry sieving. That is, in a classification by dry sieving, a powder particle having a deformed shape is relatively difficult to remove.

In a sieve classification, the particle size of the iron-based soft magnetic alloy powder can be regulated for example by changing a powder feed amount per one sieving process, a sieving time, and/or a mesh size. Further, by increasing the number of times of passing the powder through the mesh, the particle having a deformed shape tends to be removed easily.

Further, the particle size may be adjusted by blending a plurality of types of iron-based soft magnetic alloy powders having different particle size distribution and/or circularity, or the average circularity, particularly of the average circularity of the large size powder in the cross section of the magnetic powder may be adjusted. For example, the iron-based soft magnetic alloy powder classified by dry sieving and the iron-based soft magnetic alloy powder classified by a wet filter filtration may be blended.

Next, the magnetic powder is produced. The above-mentioned iron-based soft magnetic alloy powder may be used as the magnetic powder, or other powder may be mixed to the above-mentioned iron-based soft magnetic alloy powder to produce the magnetic powder. The composition of powder being mixed is not particularly limited. For example, pure iron powder, carbonyl iron powder, permalloy powder, Fe—Si based soft magnetic alloy powder, Fe—Si—Cr based soft magnetic alloy powder, Fe—Co based soft magnetic alloy powder, and the like may be blended. Also, the iron-based soft magnetic alloy powder having different compositions may be blended. By controlling the particle size distributions of the magnetic powders being blended, a packing density of the magnetic powder in the magnetic core obtained at the end can be controlled. Also, the magnetic powders may be insulation coated.

When the magnetic powder is produced by blending other powder to the iron-based soft magnetic alloy powder, a ratio of the iron-based soft magnetic alloy powder in the magnetic powder may be 50 mass % or more, 70 mass % or more, and 90 mass % or more.

A Morphologi G3 (made by Malvern Panalytical Ltd) may be used to confirm a number-based particle size distribution and the like of the magnetic powder before compacting. A Morphologi G3 is a device which disperses the powder by air, and a shape of individual particle is projected, thereby evaluation can be carried out. The particle shape having a particle size approximately within a range of 0.5 μm to several mm by an optical microscope or a laser microscope can be evaluated by a Morphologi G3.

Since a Morphologi G3 can make a projection of many particles at one time for evaluation, shapes of many particles can be evaluated in short time. Therefore, it is suited for evaluating the particle size distribution and the like of the soft magnetic alloy powder before compacting. For example, projections of 20000 particles are produced, and a particle size and a circularity of each particle is automatically calculated, and an average circularity of the particles having particle sizes within a predetermined range is calculated.

The number-based particle size distribution of the magnetic powder confirmed by a Morphologi G3 and the number-based particle size distribution of the magnetic powder in the cross section of the magnetic core obtained at the end do not match. D50 and D90 of the particles of the magnetic powder in the cross section of the magnetic core obtained at the end are smaller than the number-based D50 and D90 of the magnetic powder confirmed by a Morphologi G3. This is because when the magnetic core is also cut, arbitrary places of the particles of the magnetic powder are cut. That is, particles of large sizes may be observed as particles of small sizes depending on where the particles are being cut.

However, the number-based particle size distribution and the circularity of the magnetic powder confirmed by a Morphologi G3 and the number-based particle size distribution and the circularity of the particles of the magnetic powder in the cross section of the magnetic core obtained at the end are correlated. Therefore, by confirming the particle size distribution and the circularity of the magnetic powder by a Morphologi G3, the particle size distribution of the particles of the magnetic powder in the cross section of the magnetic core obtained at the end can be estimated to some degree. That is, by controlling the number-based particle size distribution and the circularity of the magnetic powder before compacting, the number-based particle size distribution and the circularity of the magnetic powder in the cross section of the magnetic core obtained at the end can be easily controlled.

Further, by compacting the obtained magnetic powder, the magnetic core can be obtained. A compacting method is not particularly limited. As one example, a method of obtaining the magnetic core by pressure compacting is described.

First, the magnetic powder and a resin are mixed. By mixing the resin, a green compact having high strength tends to be obtained easily. A type of the resin is not particularly limited. For example, a phenol resin, an epoxy resin, and the like may be mentioned. An added amount of the resin is also not particularly limited. When the resin is added, 1 mass % or more and 5 mass % or less of the resin may be added to the magnetic powder.

A granulated powder is obtained by granulating a mixture made of the magnetic powder and the resin. A granulation method is not particularly limited. For example, a stirrer may be used for granulation. A particle size of the granulated powder is not particularly limited.

The obtained granulated powder is pressure compacted to obtain the green compact. A compacting pressure is not particularly limited. For example, a surface pressure may be 1 ton/cm$^2$ or more and 10 ton/cm$^2$ or less. As the compacting pressure increases, the relative permeability tends to increase easily, however when the particle size distribution of the magnetic powder is broad, a high relative permeability can be obtained even if the compacting pressure is made lower than usual compacting pressure. This is because the obtained magnetic core tends to densified easily.

Further, by curing the resin included in the green compact, the magnetic core can be obtained. A curing method is not particularly limited, and a heat treatment may be performed which can cure the used resin.

A purpose of use of the magnetic core is not particularly limited. For example, it may be suitably used as a magnetic core for an inductor, particularly for a power inductor. Further, the magnetic core according to the present embodiment can be suitably used as an inductor in which a magnetic core and a coil part are integrally formed.

Further, the above-mentioned magnetic core and the magnetic component using the above-mentioned magnetic core can be suitably used for an electronic device.

Particularly, the above-mentioned magnetic core has a high permeability and a high voltage resistance, and has small variation in the voltage resistance, thus the above-mentioned magnetic core may be suitably used in a field where downsizing, lighter weight, and higher reliability are demanded. For example, it may be suitably used for a magnetic core, a magnetic component, and an electronic device installed in hybrid vehicles, plug-on hybrid vehicles, and electronic vehicles.

EXAMPLES

Hereinafter, the present invention is described based on examples.

Experiment Example 1

Iron-based soft magnetic alloy powders A to F shown in Table 1 were produced. First, ingots of materials were weighed and prepared so to obtain a mother alloy having a composition $Fe_{0.735}Nb_{0.030}B_{0.090}Si_{0.135}Cu_{0.100}$ in atomic ratio. The ingots were placed in a crucible provided in a gas atomization apparatus.

Next, the mother alloy is placed inside a heat resistant container 22 provided in an atomization apparatus 10. Next, the heat resistant container 22 was heated by high frequency induction using a heating coil 24 provided outside of the heat resistant container 22. Then, the raw material metal in the heat resistant container 22 was melted and mixed, thereby a molten metal (molten) of 1500° C. was obtained.

The obtained molten metal was sprayed at a temperature of 1500° C. into the cylinder 32 of a cooling part 30, then argon gas was sprayed at a gas spraying pressure shown in Table 1 to form many droplets. Note that, an injection amount of the molten metal and a pump pressure of the cooling water were set as shown in Table 1. The droplets collided against the coolant flow of inverted cone shape which was formed by a cooling water supplied at a pump pressure as shown in Table 1, thereby the droplets changed into a fine powder, and the fine powder was collected.

Note that, regarding the atomization apparatus 10 shown in FIG. 4A and FIG. 4B, inner diameter of an inner surface of the cylinder 32 was 300 mm, an angle θ1 was 20 degrees, and D1/D2 was as shown in Table 1.

Further, a heat treatment was performed at 550° C. for 60 minutes. Then, a classification was performed at a method shown in Table 1. For a classification using dry sieving, the powder was classified by sieving in the air. For a classification using wet filter filtration, the powder was dispersed in IPA as a dispersion medium, then the dispersion medium in which the powder was dispersed was filtrated by a filter.

In addition to the conditions shown in Table 1, by changing a classification method, and an opening size of mesh or filter, a number-based particle size distribution of the iron-based soft magnetic alloy powder and an average particle size of the iron-based soft magnetic alloy of D90 or more were varied. The iron-based soft magnetic alloy powders A and B were set to satisfy D10 of 2.0 to 4.0 μm, D50 of 7.0 to 12 μm, and D90 of 21 to 24 μm. The iron-based soft magnetic alloy powders C and D were set to satisfy D10 of 1.5 to 3.0 μm, D50 of 4.0 to 6 μm, and D90 of 8 to 15 μm. The iron-based soft magnetic alloy powders E and F were set to satisfy D10 of 3.0 to 8.0 μm, D50 of 15 to 25 μm, and D90 of 60 to 74 μm. Also, the iron-based soft magnetic alloy powders A, C, and E were set to satisfy 0.60 to 0.65 of an average circularity of the iron-based soft magnetic alloy powder of D90 or more; the iron-based soft magnetic alloy powders B, D, and F were set to satisfy 0.93 to 0.98 of an average circularity of the iron-based soft magnetic alloy powder of D90 or more. By setting the number-based particle size distribution of the iron-based soft magnetic alloy powder and the average particle size of the iron-based soft magnetic alloy of D90 or more within the above-mentioned range, the average particle size and the average circularity of the large size powder at the cross section of the core can attain the values shown in below tables.

Note that, the number-based D10, D50, and D90 of the iron-based soft magnetic alloy powder, and the average circularity of the number-based D90 or more of the iron-based soft magnetic alloy powder were measured by observing the shapes of 20000 particles or more of the powder particles using a Morphologi G3 (made by Malvern Panalytical Ltd) under the magnification of 10×. Specifically, the powder of 3 cc volume was dispersed at an air pressure of 1 to 3 bar to take the projection image by a laser microscope. The number-based D10, D50, D90 of the iron-based soft magnetic alloy powder, and the average circularity of the number-based D90 or more of the iron-based soft magnetic alloy powder were calculated from the particle size of each powder particle. Note that, the particle size of each powder particle was Heywood diameter.

ICP analysis was used to confirm that the composition of the mother alloy and the composition of the iron-based soft magnetic alloy powder were about the same.

Each iron-based soft magnetic alloy powder was verified whether it was made of amorphous or crystal. The peak derived from crystal was verified using XRD to determine whether the iron-based soft magnetic alloy powder was amorphous. Further, a heat treatment was performed to each iron-based soft magnetic alloy powder at 550° C. for 1 hour. Then, the peak derived from crystal was verified again using XRD, and the crystal size of the crystal particle was verified to be 5 nm or more and 50 nm or less. That is, the above-mentioned iron-based soft magnetic alloy powders were all confirmed to include nanocrystals.

Next, other than the above-mentioned soft magnetic alloy powder, carbonyl iron powder was prepared as iron powder. The particle size distribution of the volume-based obtained by a laser diffraction analysis of the carbonyl iron powder showed D50 of 1.0 μm.

TABLE 1

| Type of powder | Injection amount (kg/min) | Gas spraying pressure (MPa) | Pump pressure (MPa) | D1/D2 | Classification method |
|---|---|---|---|---|---|
| Powder A | 1.0 | 7 | 10 | 1/10 | Dry sieving |
| Powder B | 1.0 | 7 | 10 | 1/2 | Wet filter filtration |

TABLE 1-continued

| Type of powder | Injection amount (kg/min) | Gas spraying pressure (MPa) | Pump pressure (MPa) | D1/D2 | Classification method |
|---|---|---|---|---|---|
| Powder C | 0.5 | 10 | 10 | 1/10 | Dry sieving |
| Powder D | 0.5 | 10 | 10 | 1/2 | Wet filter filtration |
| Powder E | 2.0 | 2 | 15 | 1/10 | Dry sieving |
| Powder F | 2.0 | 2 | 15 | 1/2 | Wet filter filtration |

Next, the above-mentioned iron-based soft magnetic alloy powders A to F and carbonyl iron powder were used to produce a toroidal core and a circular column core.

The iron-based soft magnetic alloy powder and carbonyl iron powder were mixed in a mass ratio shown in Tables 2 to 4 to obtain a magnetic powder. Next, the magnetic powder and the resin (phenol resin) were mixed. The resin was mixed in an amount shown in Table 2 with respect to the amount of the magnetic powder. Next, using a general planetary mixer as a stirrer, granulation was done to obtain a granulated powder having a particle size of 500 m or so. Next, the obtained granulated powder was press compacted at a surface pressure of 4 ton/cm$^2$ (392 MPa) to 8 ton/cm$^2$ (784 MPa) and adjusted so to have a total area of the particles of the magnetic powder as shown in Table 2. By press compacting, a green compact of a toroidal shape having an outer diameter of 11 mmφ, an inner diameter of 6.5 mmφ, and a height of 6.0 mm was produced; and a green compact of a circular column shape having a diameter of 8.0 mmφ and a height of 8.0 mm was produced. The obtained green compacts were cured at 150° C., and the toroidal core and the circular column core were produced. These cores were produced for the number necessary for the below tests.

Total Area Ratio of Particles of Magnetic Powder

The toroidal core was cut at arbitrary cross section, and observed under magnification of 500× using SEM. An observation range included at least 1000 particles of the magnetic powder. Then, a total area ratio of the magnetic powder was calculated which is a sum of the total area ratio of the particles of the iron-based soft magnetic alloy powder and the total area ratio of particles of the carbonyl iron powder. Note that, when it was difficult to determine the particles of the magnetic powder and the resin layer under the above-mentioned magnification, then the magnification was increased. In such case, the total area of the observation range was adjusted to be the same. For example, when the observation was done under the magnification of 1000×, the images of 4 times more were used so that the total area ratio of the observation range was the same as the total area ratio of observed under 500×.

Average Elliptic Circularity of Particles of Magnetic Powder

The elliptic circularities of all of the particles of the magnetic powder were calculated and the average was taken.

Average Particle Size and Average Circularity of Large Size Particles

In the above-mentioned observation field, a circle equivalent particle size (Heywood diameters) of each particle of the magnetic powder was calculated to verify the particle size distribution of the magnetic powder in the toroidal core. Then, in the above-mentioned observation field of the cross section of the magnetic core, the particles of the magnetic powder were extracted from the particles having largest size; and the particles when a ratio of a cumulative area of the extracted particles reaches the smallest area ratio exceeding 20% of the total area ratio of the particles of the magnetic powder were defined as the large size particles. Further, the average particle size and the average circularity of the large size particles were calculated. Also, it was confirmed by a composition map of EDS, in all experiment examples, the large size particles were either one of the particles of iron-based soft magnetic alloy powders A to F.

Note that, for all of the experiment examples, D50 of the magnetic powder at the cross section of the toroidal core was calculated and confirmed that D50 was within a range of 1 μm or more and 100 μm or less.

Relative Permeability

UEW wire was wound to the toroidal core, and the relative permeability at 100 kHz was measured by 4284A PRECISION LCR METER (HP Development Company, L.P). The relative permeability was evaluated with respect to the relative permeability of a comparative example which was performed under the same condition as an example but having a smaller average circularity of the large size particles since the iron-based soft magnetic alloy powders B, D, and F were not used. The relative permeability was considered good when it was 1.04 times or more of the relative permeability of the comparative example.

Voltage Resistance and m Value

Regarding twenty circular column cores, In—Ga electrodes were formed to two faces which were perpendicular to a thickness direction. Next, voltage was applied using a source meter (THK-2011ADMPT made by TAMADEN-SOKU Co., Ltd.) to measure the voltage when 1 mA current flew. Then, the voltage was divided by the thickness of the circular column, thereby the voltage resistance of the circular column core was measured. The average of the voltage resistances of the twenty circular column cores was determined as the voltage resistance of each experiment example. Further, regarding the voltage resistances of the twenty circular column cores were performed with Weibull plot to obtain the m value of each experiment example. The m value of 3.0 or more was considered good.

Also, the voltage resistance was evaluated with respect to the voltage resistance of a comparative example which was performed under the same condition as an example but having a smaller average circularity of the large size particles since the iron-based soft magnetic alloy powders B, D, and F were not used. The voltage resistance was considered good when it was 1.08 times or more of the voltage resistance of the comparative example.

Further, "voltage resistance×relative permeability" was evaluated with respect to the "voltage resistance×relative permeability" of a comparative example which was performed under the same condition as an example but having a smaller average circularity of the large size particles since the iron-based soft magnetic alloy powders B, D, and F were not used. The "voltage resistance×relative permeability" was considered good when it was 1.2 times or more of the "voltage resistance×relative permeability" of the comparative example.

TABLE 2

| | | Soft magnetc alloy powder Blending ratio (mass ratio) | | Magnetic powder Soft magnetic alloy powder: Iron powder | | Toroidal core | | | | | Circular column core | | |
|---|---|---|---|---|---|---|---|---|---|---|---|---|---|
| Sample No. | Example/ Comparative example | Powder A | Powder B | (mass ratio) | Resin amount mass % | Total area ratio of particles of magnetic powder (%) | Average elliptic circu- larity of particles of magnetic powder | Average particle size of large size particles | Average circu- larity of Large size particles | Relative perme- ability | Volt- age resist- ance (V/mm) | m value | Voltage resis- tance × Relative perme- ability (V/mm) |
| 1 | Comparative example | 100 | 0 | 100:0 | 2.0 | 75.4 | 0.90 | 21.7 | 0.65 | 32 | 58 | 5.2 | 1856 |
| 2 | Example | 70 | 30 | 100:0 | 2.0 | 74.3 | 0.90 | 22.4 | 0.74 | 40 | 63 | 5.5 | 2520 |
| 3 | Example | 50 | 50 | 100:0 | 2.0 | 75.3 | 0.90 | 22.4 | 0.81 | 41 | 61 | 5.4 | 2501 |
| 4 | Example | 20 | 80 | 100:0 | 2.0 | 75.8 | 0.90 | 22.3 | 0.90 | 41 | 63 | 5.2 | 2583 |
| 5 | Example | 5 | 95 | 100:0 | 2.0 | 74.4 | 0.90 | 23.1 | 0.95 | 42 | 63 | 5.6 | 2646 |
| 6 | Example | 0 | 100 | 100:0 | 2.0 | 76.0 | 0.90 | 22.4 | 0.97 | 42 | 64 | 5.4 | 2688 |
| 7 | Comparative example | 100 | 0 | 90:10 | 2.0 | 80.9 | 0.90 | 21.1 | 0.64 | 42 | 38 | 2.1 | 1596 |
| 8 | Example | 70 | 30 | 90:10 | 2.0 | 80.5 | 0.90 | 21.4 | 0.73 | 48 | 43 | 3.5 | 2064 |
| 9 | Example | 50 | 50 | 90:10 | 2.0 | 80.5 | 0.90 | 22.4 | 0.82 | 49 | 51 | 4.4 | 2499 |
| 10 | Example | 20 | 80 | 90:10 | 2.0 | 79.6 | 0.90 | 20.3 | 0.91 | 50 | 52 | 4.8 | 2600 |
| 11 | Example | 5 | 95 | 90:10 | 2.0 | 79.1 | 0.90 | 20.4 | 0.94 | 51 | 55 | 4.9 | 2805 |
| 12 | Example | 0 | 100 | 90:10 | 2.0 | 80.0 | 0.90 | 22.1 | 0.97 | 51 | 60 | 5.3 | 3060 |
| 13 | Comparative example | 100 | 0 | 80:20 | 2.0 | 81.2 | 0.90 | 20.2 | 0.62 | 53 | 24 | 2.1 | 1272 |
| 14 | Example | 70 | 30 | 80:20 | 2.0 | 82.0 | 0.90 | 18.1 | 0.75 | 58 | 42 | 3.1 | 2436 |
| 15 | Example | 50 | 50 | 80:20 | 2.0 | 81.5 | 0.90 | 18.5 | 0.80 | 59 | 43 | 3.3 | 2537 |
| 16 | Example | 20 | 80 | 80:20 | 2.0 | 81.6 | 0.90 | 18.6 | 0.89 | 60 | 44 | 3.4 | 2640 |
| 17 | Example | 5 | 95 | 80:20 | 2.0 | 81.7 | 0.90 | 20.1 | 0.93 | 62 | 46 | 3.5 | 2852 |
| 18 | Example | 0 | 100 | 80:20 | 2.0 | 82.0 | 0.90 | 19.2 | 0.95 | 63 | 49 | 3.8 | 3087 |
| 19 | Comparative example | 100 | 0 | 70:30 | 2.0 | 84.3 | 0.90 | 17.3 | 0.64 | 55 | 21 | 1.8 | 1155 |
| 20 | Example | 70 | 30 | 70:30 | 2.0 | 84.1 | 0.90 | 18.1 | 0.73 | 60 | 41 | 3.3 | 2460 |
| 21 | Example | 50 | 50 | 70:30 | 2.0 | 84.9 | 0.90 | 16.3 | 0.83 | 61 | 47 | 3.4 | 2867 |
| 22 | Example | 20 | 80 | 70:30 | 2.0 | 84.1 | 0.90 | 16.2 | 0.91 | 62 | 48 | 3.5 | 2976 |
| 23 | Example | 5 | 95 | 70:30 | 2.0 | 86.0 | 0.90 | 17.3 | 0.96 | 64 | 49 | 3.6 | 3136 |
| 24 | Example | 0 | 100 | 70:30 | 2.0 | 85.8 | 0.90 | 17.1 | 0.98 | 65 | 50 | 3.7 | 3250 |
| 25 | Comparative example | 100 | 0 | 60:40 | 2.0 | 81.1 | 0.90 | 16.8 | 0.64 | 40 | 38 | 2.1 | 1520 |
| 26 | Example | 70 | 30 | 60:40 | 2.0 | 81.3 | 0.90 | 17.0 | 0.73 | 50 | 43 | 3.4 | 2150 |
| 27 | Example | 50 | 50 | 60:40 | 2.0 | 78.6 | 0.90 | 14.7 | 0.83 | 52 | 51 | 3.5 | 2652 |
| 28 | Example | 20 | 80 | 60:40 | 2.0 | 80.0 | 0.90 | 15.6 | 0.91 | 53 | 52 | 3.6 | 2756 |
| 29 | Example | 5 | 95 | 60:40 | 2.0 | 80.7 | 0.90 | 17.0 | 0.96 | 54 | 55 | 3.7 | 2970 |
| 30 | Example | 0 | 100 | 60:40 | 2.0 | 79.9 | 0.90 | 16.2 | 0.98 | 55 | 60 | 3.8 | 3300 |
| 31 | Comparative example | 100 | 0 | 50:50 | 2.0 | 79.9 | 0.90 | 15.4 | 0.64 | 42 | 34 | 1.9 | 1428 |
| 32 | Example | 70 | 30 | 50:50 | 2.0 | 79.0 | 0.90 | 16.9 | 0.73 | 52 | 53 | 3.0 | 2756 |
| 33 | Example | 50 | 50 | 50:50 | 2.0 | 78.7 | 0.90 | 16.3 | 0.83 | 51 | 54 | 3.3 | 2754 |
| 34 | Example | 20 | 80 | 50:50 | 2.0 | 80.3 | 0.90 | 14.4 | 0.91 | 53 | 54 | 3.4 | 2862 |
| 35 | Example | 5 | 95 | 50:50 | 2.0 | 78.7 | 0.90 | 17.3 | 0.96 | 54 | 55 | 3.6 | 2970 |
| 36 | Example | 0 | 100 | 50:50 | 2.0 | 79.4 | 0.90 | 16.1 | 0.98 | 55 | 62 | 3.7 | 3410 |
| 37 | Comparative example | 100 | 0 | 70:30 | 3.0 | 75.2 | 0.90 | 17.3 | 0.64 | 34 | 56 | 5.5 | 1904 |
| 38 | Example | 70 | 30 | 70:30 | 3.0 | 75.3 | 0.90 | 18.1 | 0.73 | 45 | 67 | 5.4 | 3015 |
| 39 | Example | 50 | 50 | 70:30 | 3.0 | 75.8 | 0.90 | 16.3 | 0.83 | 46 | 69 | 5.6 | 3174 |
| 40 | Example | 20 | 80 | 70:30 | 3.0 | 75.9 | 0.90 | 16.2 | 0.91 | 47 | 70 | 5.6 | 3290 |
| 41 | Example | 5 | 95 | 70:30 | 3.0 | 75.1 | 0.90 | 17.3 | 0.96 | 47 | 74 | 5.6 | 3478 |
| 42 | Example | 0 | 100 | 70:30 | 3.0 | 75.8 | 0.90 | 17.1 | 0.98 | 48 | 73 | 5.4 | 3504 |
| 43 | Comparative example | 100 | 0 | 70:30 | 1.5 | 89.8 | 0.90 | 17.3 | 0.64 | 66 | 18 | 2.1 | 1188 |
| 44 | Example | 70 | 30 | 70:30 | 1.5 | 88.5 | 0.90 | 18.1 | 0.73 | 69 | 40 | 3.1 | 2760 |
| 45 | Example | 50 | 50 | 70:30 | 1.5 | 89.9 | 0.90 | 16.3 | 0.83 | 70 | 41 | 3.2 | 2870 |
| 46 | Example | 20 | 80 | 70:30 | 1.5 | 88.2 | 0.90 | 16.2 | 0.91 | 71 | 42 | 3.4 | 2982 |
| 47 | Example | 5 | 95 | 70:30 | 1.5 | 88.1 | 0.90 | 17.3 | 0.96 | 72 | 44 | 3.5 | 3168 |
| 48 | Example | 0 | 100 | 70:30 | 1.5 | 88.5 | 0.90 | 17.1 | 0.98 | 74 | 47 | 3.6 | 3478 |

TABLE 3

| Sample No. | Example/ Comparative example | Soft magnetc alloy powder Blending ratio (mass ratio) Powder C | Powder D | Magnetic Powder Soft magnetic alloy powder: Iron powder (mass ratio) | Resin amount mass % | Toroidal core Total area ratio of particles of magnetic powder (%) | Average elliptic circularity of particles of magnetic powder | Average particle size of large size particles (µm) | Average circularity of Large size particles | Relative permeability | Circular column core Voltage resistance (V/mm) | m value | Voltage resistance × Relative permeability (V/mm) |
|---|---|---|---|---|---|---|---|---|---|---|---|---|---|
| 49 | Comparative example | 100 | 0 | 90:10 | 2.0 | 80.8 | 0.90 | 5.3 | 0.61 | 15 | 47 | 3.4 | 705 |
| 50 | Example | 70 | 30 | 90:10 | 2.0 | 80.2 | 0.90 | 5.3 | 0.71 | 23 | 52 | 4.3 | 1196 |
| 51 | Example | 50 | 50 | 90:10 | 2.0 | 80.8 | 0.90 | 5.2 | 0.79 | 24 | 54 | 5.2 | 1296 |
| 52 | Example | 20 | 80 | 90:10 | 2.0 | 80.3 | 0.90 | 5.2 | 0.88 | 25 | 56 | 5.4 | 1400 |
| 53 | Example | 5 | 95 | 90:10 | 2.0 | 80.2 | 0.90 | 5.1 | 0.94 | 26 | 65 | 6.3 | 1690 |
| 54 | Example | 0 | 100 | 90:10 | 2.0 | 81.1 | 0.90 | 5.4 | 0.95 | 26 | 73 | 6.2 | 1898 |

TABLE 4

| Sample No. | Example/ Comparative example | Soft magnetc alloy powder Blending ratio (mass ratio) Powder E | Powder F | Magnetic powder Soft magnetic alloy powder: Iron powder (mass ratio) | Resin amount mass % | Toroidal core Total area ratio of particles of magnetic powder (%) | Average elliptic circularity of particles of magnetic powder | Average particle size of large size particles (µm) | Average circularity of Large size particles | Relative permeability | Circular column core Voltage resistance (V/mm) | m value | Voltage resistance × Relative permeability (V/mm) |
|---|---|---|---|---|---|---|---|---|---|---|---|---|---|
| 55 | Comparative example | 100 | 0 | 90:10 | 2.0 | 81.4 | 0.90 | 50.0 | 0.60 | 48 | 23 | 2.3 | 1104 |
| 56 | Example | 70 | 30 | 90:10 | 2.0 | 79.2 | 0.90 | 49.6 | 0.71 | 52 | 41 | 3.2 | 2132 |
| 57 | Example | 50 | 50 | 90:10 | 2.0 | 78.7 | 0.90 | 49.9 | 0.76 | 52 | 43 | 3.4 | 2236 |
| 58 | Example | 20 | 80 | 90:10 | 2.0 | 79.1 | 0.90 | 48.6 | 0.85 | 53 | 44 | 3.6 | 2332 |
| 59 | Example | 5 | 95 | 90:10 | 2.0 | 80.7 | 0.90 | 48.6 | 0.92 | 53 | 45 | 4.4 | 2385 |
| 60 | Example | 0 | 100 | 90:10 | 2.0 | 81.4 | 0.90 | 48.3 | 0.93 | 55 | 46 | 4.8 | 2530 |

According to Tables 2 to 4, the examples of which the total area ratio of the particles of the magnetic powder was 75% or more and 90% or less and the average circularity of the large size particles was 0.70 or more had high relative permeability and voltage resistance and a smaller variation in the voltage resistance compared to the comparative example having substantially the same constitution except that the average circularity of the large size particles was less than 0.70. Further, the examples had a good "voltage resistance×relative permeability". Note that, in the above examples, the voltage resistance of the circular column core was measured, and when the voltage resistance of the toroidal core was measured, it was confirmed that the voltage resistance of the toroidal core was the same as the voltage resistance of the circular column cores.

Experiment Example 2

The magnetic powders of Sample No. 19 to 24 were formed with an insulation coating by carrying out phosphate treatment to the magnetic powders. A thickness of the insulation coating on the soft magnetic alloy powder was 20 nm, and a thickness of the insulation coating on the carbonyl iron powder was 10 nm. Evaluation results of Experiment example 1 are shown in Table 5.

TABLE 5

| Sample No. | Example/ Comparative example | Soft magnetc alloy powder Blending ratio (mass ratio) Powder A | Powder B | Magnetic powder Soft magnetic alloy powder: Iron powder (mass ratio) | Resin amount mass % | Insulation coating | Toroidal core Total area ratio of particles of magnetic powder (%) | Average elliptic circularity of particles of magnetic powder | Average particle size of large size particles (μm) | Average circularity of Large size particles | Relative permeability | Circular column core Voltage resistance (V/mm) | m value | Voltage resistance × Relative permeability (V/mm) |
|---|---|---|---|---|---|---|---|---|---|---|---|---|---|---|
| 19 | Comparative example | 100 | 0 | 70:30 | 2.0 | Not formed | 84.3 | 0.90 | 17.3 | 0.64 | 55 | 21 | 1.8 | 1155 |
| 20 | Example | 70 | 30 | 70:30 | 2.0 | Not formed | 84.1 | 0.90 | 18.1 | 0.73 | 60 | 41 | 3.3 | 2460 |
| 21 | Example | 50 | 50 | 70:30 | 2.0 | Not formed | 84.9 | 0.90 | 16.3 | 0.83 | 61 | 47 | 3.4 | 2867 |
| 22 | Example | 20 | 80 | 70:30 | 2.0 | Not formed | 84.1 | 0.90 | 16.2 | 0.91 | 62 | 48 | 3.5 | 2976 |
| 23 | Example | 5 | 95 | 70:30 | 2.0 | Not formed | 86.0 | 0.90 | 17.3 | 0.96 | 64 | 49 | 3.6 | 3136 |
| 24 | Example | 0 | 100 | 70:30 | 2.0 | Not formed | 85.8 | 0.90 | 17.1 | 0.98 | 65 | 50 | 3.7 | 3250 |
| 19a | Comparative example | 100 | 0 | 70:30 | 2.0 | Formed | 84.3 | 0.90 | 17.3 | 0.65 | 53 | 79 | 2.3 | 4187 |
| 20a | Example | 70 | 30 | 70:30 | 2.0 | Formed | 84.1 | 0.90 | 18.0 | 0.75 | 57 | 145 | 4.5 | 8265 |
| 21a | Example | 50 | 50 | 70:30 | 2.0 | Formed | 84.9 | 0.90 | 16.4 | 0.84 | 58 | 154 | 4.8 | 8932 |
| 22a | Example | 20 | 80 | 70:30 | 2.0 | Formed | 84.1 | 0.90 | 16.4 | 0.90 | 61 | 158 | 4.9 | 9638 |
| 23a | Example | 5 | 95 | 70:30 | 2.0 | Formed | 86.0 | 0.90 | 17.0 | 0.95 | 62 | 165 | 4.9 | 10230 |
| 24a | Example | 0 | 100 | 70:30 | 2.0 | Formed | 85.8 | 0.90 | 17.3 | 0.96 | 63 | 171 | 5.1 | 10773 |

According to Table 5, when the insulation coating was formed, the results were the same as in case without the insulation coating.

Experiment Example 3

Sample No. 7a and 7b were produced under the same conditions as Sample No. 7 except that the deformed powder included in the carbonyl iron powder was removed by an air flow classification. Sample No. 12a and 12b were produced under the same conditions as Sample No. 12 except that the deformed powder included in the carbonyl iron powder was removed by an air flow classification. By removing the deformed powder, the sphericity of the carbonyl iron powder increased, and the average elliptic circularity of the particles of the magnetic powder increased. Results are shown in Table 6.

TABLE 6

| Sample No | Example/ Comparative example | Soft magnetc alloy powder Blending ratio (mass ratio) Powder A | Powder B | Magnetic powder Soft magnetic alloy powder: Iron powder (mass ratio) | Toroidal core Total area ratio of particles of magnetic powder (%) | Average elliptic circularity of particles of magnetic powder | Average particle size of large size particles (μm) | Average circularity of Large size particles | Relative permeability | Circular column core Voltage resistance (V/mm) | m value | Voltage resistance × Relative permeability (V/mm) |
|---|---|---|---|---|---|---|---|---|---|---|---|---|
| 7 | Comparative example | 100 | 0 | 90:10 | 80.9 | 0.90 | 21.1 | 0.64 | 42 | 38 | 2.1 | 1596 |
| 12 | Example | 0 | 100 | 90:10 | 80.0 | 0.90 | 22.1 | 0.97 | 51 | 60 | 5.3 | 3060 |
| 7a | Comparative example | 100 | 0 | 90:10 | 79.7 | 0.95 | 21.1 | 0.64 | 43 | 38 | 2.2 | 1634 |
| 12a | Example | 0 | 100 | 90:10 | 79.8 | 0.95 | 22.1 | 0.97 | 50 | 63 | 6.8 | 3150 |
| 7b | Comparative example | 100 | 0 | 90:10 | 79.6 | 0.99 | 21.1 | 0.64 | 42 | 38 | 2.3 | 1596 |
| 12b | Example | 0 | 100 | 90:10 | 79.9 | 0.99 | 22.1 | 0.97 | 49 | 65 | 7.6 | 3185 |

According to Table 6, whether the deformed powder was removed or not, the same results were obtained. Further, as the average elliptic circularity of the particles of the magnetic powder increased, the voltage resistance and the m value were increased.

Experiment Example 4

Sample No. 67, 70, and 72 were produced under the same conditions as Sample No. 43 of Experiment 1 except that a fine structure was changed by changing a heat treatment condition of the powder A. Also, Sample No. 68, 71, and 73 were produced under the same conditions as Sample No. 44 of Experiment 1 except that a fine structure was changed by changing a heat treatment condition of the powders A and B. Results are shown in Table 7. Note that, the powder indicated with "amorphous" in the column of the fine structure shown in Table 7 means that the powder had an amorphous structure. The powder indicated as "nanocrystal" means that the powder had a structure made of nanocrystals. The powder indicated with "hetero structure" means that the powder had a nanohetero structure. The powder indicated with "crystal" means that the powder had a structure made of crystals having a crystal size of 100 nm or more. Further, the examples and comparative examples having the same crystal condition of the soft magnetic alloy powder were compared.

Further, regarding the powder A, two types of the powder A were prepared which was a powder A performed with a heat treatment for one hour at 550° C. and having a structure made of nanocrystals; and another powder A without heat treatment and having an amorphous structure. Also, regarding the powder B, a heat treatment was not performed and a structure made of amorphous was prepared. Sample No. 69a and Sample No. 69 were produced by blending the powders in a ratio indicated in Table 8. Results are shown in Table 8. Sample No. 69a and Sample No. 69 had a same ratio between the soft magnetic alloy powder made of nanocrystal structure and the soft magnetic alloy powder made of amorphous structure which was a ratio of 70:30.

TABLE 7

| | | Heat treatment | | Crystal condition | | Soft magnetc alloy powder Blending ratio (mass ratio) | | Magnetic powder Soft magnetic alloy powder: Iron powder (mass ratio) | Toroidal Core | | | | | | | Voltage resistance × Relative permeability (V/mm) |
|---|---|---|---|---|---|---|---|---|---|---|---|---|---|---|---|---|
| | | | | | | | | | Total area ratio of particles of magnetic powder (%) | Average elliptic circularity of particles of magnetic powder | Average particle size of large size particles (μm) | Average circularity of Large size particles | Permeability | Circular column core Voltage resistance (V/mm) | Circular column core m value | |
| Sample No. | Example/ Comparative example | Powder A | Powder B | Powder A | Powder B | Powder A | Powder B | | | | | | | | | |
| 43 | Comparative example | 550° C.-1 h | — | nanocrystal | — | 100 | 0 | 70:30 | 89.8 | 0.90 | 17.3 | 0.64 | 66 | 18 | 2.1 | 1188 |
| 44 | Example | 550° C.-1 h | 550° C.-1 h | nanocrystal | nanocrystal | 70 | 30 | 70:30 | 88.5 | 0.90 | 18.1 | 0.73 | 69 | 40 | 3.1 | 2760 |
| 67 | Comparative example | no heat treatment | | amorphous | — | 100 | 0 | 70:30 | 89.2 | 0.90 | 17.3 | 0.64 | 53 | 18 | 2.1 | 954 |
| 68 | Example | no heat treatment | no heat treatment | amorphous | amorphous | 70 | 30 | 70:30 | 89.1 | 0.90 | 18.1 | 0.73 | 60 | 41 | 3.2 | 2460 |
| 70 | Comparative example | 400° C.-1 h | | hetero structure | — | 100 | 0 | 70:30 | 89.0 | 0.90 | 17.3 | 0.64 | 53 | 18 | 2.1 | 954 |
| 71 | Example | 400° C.-1 h | 400° C.-1 h | hetero structure | hetero structure | 70 | 30 | 70:30 | 89.3 | 0.90 | 18.1 | 0.73 | 61 | 41 | 3.1 | 2501 |
| 72 | Comparative example | 600° C.-1 h | — | crystal | — | 100 | 0 | 70:30 | 89.1 | 0.90 | 17.3 | 0.64 | 48 | 18 | 2.1 | 864 |
| 73 | Example | 600° C.-1 h | 600° C.-1 h | crystal | crystal | 70 | 30 | 70:30 | 88.8 | 0.90 | 18.1 | 0.73 | 51 | 42 | 3.0 | 2142 |

TABLE 8

| Sample No. | Example/ Comparative example | Soft magnetc alloy powder Blending ratio (mass ratio): Powder A (nano-crystal) | Powder A (amor-phous) | Powder B (amor-phous) | Magnetic powder Soft magnetic alloy powder: Iron powder (mass ratio) | Toroidal core: Total area ratio of particles of magnetic powder (%) | Average elliptic circularity of particles of magnetic powder | Average particle size of large size particles (μm) | Average circularity of Large size particles | Perme-ability | Circular column core: Voltage resist-ance (V/mm) | m value | Voltage resis-tance × Relative perme-ability (V/mm) |
|---|---|---|---|---|---|---|---|---|---|---|---|---|---|
| 69a | Comparative example | 70 | 30 | 0 | 70:30 | 89.1 | 0.90 | 17.3 | 0.64 | 56 | 20 | 2.0 | 1120 |
| 69 | Example | 70 | 0 | 30 | 70:30 | 89.4 | 0.90 | 18.1 | 0.73 | 63 | 40 | 3.1 | 2520 |

According to Table 7 and Table 8, regardless of a crystal condition of the powder, the same results as Experiment example 1 were obtained. Further, the best magnetic properties were obtained when the fine structure of the powder A and B were made of nanocrystals.

Experiment Example 5

The powder G was produced under the same conditions as the powder A except that various ingots were prepared so that a mother alloy having a composition of $Fe_{0.78475}Nb_{0.070}B_{0.090}Si_{0.020}P_{0.030}C_{0.005}S_{0.00025}$ in terms of atomic ratio was obtained. Also, the powder H was produced under the same conditions as the powder B except that various ingots were prepared so that a mother alloy having a composition of $Fe_{0.78475}Nb_{0.070}B_{0.090}Si_{0.020}P_{0.030}C_{0.0005}S_{0.00025}$ in terms of atomic ratio was obtained. Sample No. 74 to 79 were produced under the same conditions as Sample No. 19 to 24 except that the powder G was used instead of the powder A and the powder H was used instead of the powder B. Results are shown in Table 9.

TABLE 9

| Sam-ple No. | Example/ Compar-ative example | Soft magnetc alloy powder Blending ratio (mass ratio): Pow-der A | Pow-der B | Pow-der G | Pow-der H | Magnetic powder Soft magnetic alloy powder: Iron powder (mass ratio) | Resin amount mass % | Toroidal core: Total area ratio of particles of magnetic powder (%) | Average elliptic circu-larity of particles of magnetic powder | Average particle size of large size particles (μm) | Average circu-larity of Large size particles | Perme-ability | Circular column core: Voltage resist-ance (V/mm) | m value | Voltage resis-tance × Relative perme-ability (V/mm) |
|---|---|---|---|---|---|---|---|---|---|---|---|---|---|---|---|
| 19 | Compar-ative example | 100 | 0 | 0 | 0 | 70:30 | 2.0 | 84.3 | 0.90 | 17.3 | 0.64 | 55 | 21 | 1.8 | 1155 |
| 20 | Example | 70 | 30 | 0 | 0 | 70:30 | 2.0 | 84.1 | 0.90 | 18.1 | 0.73 | 60 | 41 | 3.3 | 2460 |
| 21 | Example | 50 | 50 | 0 | 0 | 70:30 | 2.0 | 84.9 | 0.90 | 16.3 | 0.83 | 61 | 47 | 3.4 | 2867 |
| 22 | Example | 20 | 80 | 0 | 0 | 70:30 | 2.0 | 84.1 | 0.90 | 16.2 | 0.91 | 62 | 48 | 3.5 | 2976 |
| 23 | Example | 5 | 95 | 0 | 0 | 70:30 | 2.0 | 86.0 | 0.90 | 17.3 | 0.96 | 64 | 49 | 3.6 | 3136 |
| 24 | Example | 0 | 100 | 0 | 0 | 70:30 | 2.0 | 85.8 | 0.90 | 17.1 | 0.98 | 65 | 50 | 3.7 | 3250 |
| 74 | Compa-rative example | 0 | 0 | 100 | 0 | 70:30 | 2.0 | 84.3 | 0.90 | 17.3 | 0.64 | 52 | 25 | 1.6 | 1300 |
| 75 | Example | 0 | 0 | 70 | 30 | 70:30 | 2.0 | 84.1 | 0.90 | 18.1 | 0.73 | 58 | 43 | 3.2 | 2494 |
| 76 | Example | 0 | 0 | 50 | 50 | 70:30 | 2.0 | 84.9 | 0.90 | 16.3 | 0.83 | 60 | 48 | 3.3 | 2880 |
| 77 | Example | 0 | 0 | 20 | 80 | 70:30 | 2.0 | 84.1 | 0.90 | 16.2 | 0.91 | 60 | 49 | 3.4 | 2940 |
| 78 | Example | 0 | 0 | 5 | 95 | 70:30 | 2.0 | 86.0 | 0.90 | 17.3 | 0.96 | 62 | 50 | 3.4 | 3100 |
| 79 | Example | 0 | 0 | 0 | 100 | 70:30 | 2.0 | 85.8 | 0.90 | 17.1 | 0.98 | 64 | 51 | 3.5 | 3264 |

According to Table 9, results were the same regardless of the composition of the powder.

NUMERICAL REFERENCES

1 . . . Results of particle shape measurement
10 . . . Atomization apparatus
20 . . . Molten metal supplier
21 . . . Molten metal
21*a* . . . Molten metal drop
30 . . . Cooling part
36 . . . Coolant introducing part
38*al* . . . Outer projection
50 . . . Coolant flow

What is claimed is:

1. A magnetic core comprising a magnetic powder, wherein a total area ratio of particles of the magnetic powder in a cross section of the magnetic core is 75% or more and 90% or less, an average circularity of large size particles is 0.71 or more and 0.98 or less when the large size particles are particles extracted from the particles of the magnetic powder in the cross section of the magnetic core in the order of size from the largest size until a cumulative area ratio of the extracted particles reaches a smallest area ratio exceeding 20% of the total area ratio of the particles of the magnetic powder, and the magnetic core has a voltage resistance×relative permeability of 2132 V/mm or more, and 3504 V/mm or less, wherein voltage resistance was measured with electrodes at a distance between them of 8 mm.

2. The magnetic core according to claim 1, wherein an average circularity of the large size particles in the cross section of the magnetic core is 0.80 or more.

3. The magnetic core according to claim 1, wherein particle sizes of the large size particles in the cross section of the magnetic core are 5 μm or more and 50 μm or less.

4. The magnetic core according to claim 1, wherein an average elliptic circularity of the particles of the magnetic powder in the cross section of the magnetic core is 0.90 or more.

5. The magnetic core according to claim 1, wherein the large size particles have amorphous structures in the cross section of the magnetic core.

6. The magnetic core according to claim 1, wherein the large size particles in the cross section of the magnetic core have nanohetero structures in which a fine crystal having a crystal size of 0.3 nm or more and less than 5 nm exists in an amorphous phase.

7. The magnetic core according to claim 1, wherein the large size particles in the cross section of the magnetic powder have structures made of nanocrystals having crystal sizes of 5 nm or more and 50 nm less.

8. The magnetic core according to claim 1 further comprising a resin.

9. A magnetic component comprising the magnetic core according to claim 1.

10. An electronic device comprising the magnetic core according to claim 1.

* * * * *